US012564207B2

(12) United States Patent
Hanna et al.

(10) Patent No.: US 12,564,207 B2
(45) Date of Patent: Mar. 3, 2026

(54) INFANT FORMULATION COMPRISING OLIVE OIL AND METHODS THEREWITH

(71) Applicant: Bobbie Baby Inc., San Francisco, CA (US)

(72) Inventors: Kevin Thomas Hanna, Galena, OH (US); Christina Berberich, Santa Cruz, CA (US)

(73) Assignee: Bobbie Baby Inc., San Francisco, CA (US)

( * ) Notice: Subject to any disclaimer, the term of this patent is extended or adjusted under 35 U.S.C. 154(b) by 0 days.

(21) Appl. No.: 19/231,387

(22) Filed: Jun. 6, 2025

(65) Prior Publication Data

US 2026/0007158 A1 Jan. 8, 2026

Related U.S. Application Data

(60) Provisional application No. 63/668,602, filed on Jul. 8, 2024.

(51) Int. Cl.
*A23L 33/115* (2016.01)
*A23L 33/00* (2016.01)

(52) U.S. Cl.
CPC ............. *A23L 33/40* (2016.08); *A23L 33/115* (2016.08)

(58) Field of Classification Search
CPC ........ A23V 2250/1842; A23V 2250/18; A23L 33/115; A23L 33/40; A23L 33/10
USPC ........................................ 426/601, 801, 607
See application file for complete search history.

(56) References Cited

U.S. PATENT DOCUMENTS

| | | | | |
|---|---|---|---|---|
| 4,721,626 A | * | 1/1988 | Rule ...................... | A23D 9/013 |
| | | | | 426/607 |
| 5,000,975 A | * | 3/1991 | Tomarelli .................. | C11C 3/10 |
| | | | | 426/607 |

| | | | | |
|---|---|---|---|---|
| 5,709,888 A | * | 1/1998 | Gil ............................ | A61P 3/00 |
| | | | | 514/45 |
| 7,829,126 B2 | | 11/2010 | Barrett-Reis | |
| 2019/0327997 A1 | * | 10/2019 | Widberg ................ | A23D 9/007 |

FOREIGN PATENT DOCUMENTS

| | | |
|---|---|---|
| AU | 2013277900 B2 | 12/2016 |
| RU | 2312525 C2 | 12/2007 |

OTHER PUBLICATIONS

Teres, S., G. Barcelo-Coblijn, M. Benet, R. Alvarez, R. Bressani, J.E. Halver and P.V. Escriba, Oleic Acid Content Is Responsible for the Reduction in Blood Pressure Induced by Olive Oil, PNAS, Sep. 16, 2008, vol. 105, No. 37, 13811-12816. (Year: 2008).*

Yamut, Tiffany Joy, BSN, RN, Linoleic Acid in Cooking Oils: What It Is and Why It Matters, May 1, 2025, pp. 1-8. https://algaecookingclub. com/zine/linoleic-acid-in-cooking-oils?srsltid=AfmBOoqKJhQI_ Fvg4QU7luw_-K4SwUdtR1pnoEIUxO7UIZn3jxdyq6Gu (Year: 2025).*

Mazzocchi, A. et al. The Role of Lipids in Human Milk and Infant Formulae. Nutrients 2018, 10, 567.

Schwingshackl, L. and Hoffmann, G. Monounsaturated fatty acids, olive oil and health status: a systematic review and meta-analysis of cohort studies. Lipids Health Dis 13, 154 (2014).

Martínez-González MA, et al. Olive oil consumption and risk of CHD and/or stroke: a meta-analysis of case-control, cohort and intervention studies. Br J Nutr. Jul. 2, 20148;112(2):248-59.

A2 Whole Milk Formula 12.7oz_ Serenity Kids®. Retrieved online Sep. 18, 2023.

Goat's Milk Formula—Designed by Nature. Retrieved online Sep. 18, 2023.

Kendamil Whole Milk Infant Formula Powder, European with HMOs, Prebiotics, No Palm Oil or Soy, with DHA, 28.2oz. Retrieved online with comments dated Aug. 31, 2023.

What Is the Best Baby Formula_—Mama Natural. Retrieved online Sep. 18, 2023.

* cited by examiner

*Primary Examiner* — Hong T Yoo
(74) *Attorney, Agent, or Firm* — Bryan Cave Leighton Paisner LLP

(57) ABSTRACT

Aspects of the present disclosure provide, inter alia, infant formulations comprising olive oil and other beneficial oils, as well as methods of providing nutrition to infants.

22 Claims, No Drawings

INFANT FORMULATION COMPRISING OLIVE OIL AND METHODS THEREWITH

CROSS REFERENCE TO RELATED APPLICATIONS

The present application claims benefit of U.S. Provisional Patent Application Ser. No. 63/668,602, filed on Jul. 8, 2024, the entire content of which is hereby incorporated by reference.

FIELD OF DISCLOSURE

Aspects of the present disclosure provides, inter alia, a novel nutritional formula for infants. Also provided are methods for providing nutrition to infants with such formulations.

Infant formulas are provided to give nutrition to infants early in life, and typically contain all of the ingredients needed to promote growth and health of the infant, including protein, carbohydrates, fats, vitamins, minerals and other nutrients. Formulas may be provided commercially in the form of powders, ready to feed liquids, and even liquid concentrates.

While infant formulas provide an important alternative to human milk, efforts to improve the nutritional content of these formulas, to match or even exceed the high level of nutrition found in human milk, is ongoing. Certain of these efforts have involved understanding the natural constituents of human milk and their properties and health effects, to inform the incorporation of corresponding ingredients into infant formulas. Other efforts have focused on identifying healthy sources of such ingredients, such as natural and preferably organic sources of infant formula ingredients, which impart the same beneficial effects as the ingredients in the human milk composition.

Essential fatty acids, such as omega 3 and omega 6 fatty acids, and other fatty acids, are believed to play an important role in the growth and development of infants, such as in infant brain development, and in other developmental areas. The quantity and quality of dietary fats and lipids in infant formulas can have a significant impact on health outcomes, and the composition of fats and lipids can vary widely according to the source that is used, resulting in different distributions and amounts of essential fatty acids. (Mazzocchi et al. Nutrients May; 10 (5): 567 (2018)).

Accordingly, there is a need for a novel nutritional formula for infants that provides the needed types of oils and/or fatty acids to promote growth and development of the infants. Aspects of this disclosure are directed to meeting these and other needs.

SUMMARY OF THE DISCLOSURE

Nutritional formulas are important sources of key dietary components, including proteins, carbohydrates, fats, vitamins and minerals. According to certain aspects, nutritional formulas will have a precisely defined composition that is specifically tailored for a particular target group. For example, an infant formula can offer nutrition suitable for infants, while other formulas can provide important dietary supplementation for seniors and individuals who have special nutritional requirements.

Accordingly, one embodiment of the present disclosure is a nutritional formula for an infant, comprising olive oil as a primary ingredient of an oil blend combined into the formula. In another embodiment, the nutritional formula may be for a toddler or young child.

Another embodiment of the present disclosure is a method for providing nutrition to an infant, comprising administering a nutritional formula disclosed herein to the infant. According to another embodiment of the present disclosure, a method for providing nutrition to a toddler or young child is provided, comprising administering a nutritional formula disclosed herein to the toddler or young child.

DETAILED DESCRIPTION OF THE DISCLOSURE

Aspects of the present disclosure provide a nutritional formula for an infant or toddler. According to certain embodiments, the nutritional formula contains olive oil, which is a natural and vegetable-derived oil that contains key fatty acids, including monounsaturated and omega-9 fatty acids, such as oleic acid, which are highly beneficial. Consumption of olive oil has been found to be associated with reduced cardiovascular risk (Schwingshackl, et all, Lipids in Health and Disease, 13, 154 (2014)). The "Mediterranean diet" associated with cultures inhabiting areas around the Mediterranean Sea, involves consumption of high levels of olive oil, has also been found to be associated with a significant reduction in chronic heart disease and stroke (Martinez-Gonzalez et al, B. J. Nutri. July 28; 112 (2): 248-59 (2014). Accordingly, olive oil is understood to be a safe and healthy ingredient for dietary consumption, providing significant benefits in health to human adults.

Embodiments of the invention herein provide a novel formulation for infants, with olive oil preferably as a primary oil ingredient. In some embodiments, the formula is for an "infant" which as referred to herein is a human baby aged 0 to 12 months. In other embodiments, the formula may also beneficially be provided to a "toddler" which as referred to herein is a human child that is more than 1 year old but less than 4 years old. In other embodiments, the formula may be for a young child, or even an older child, teen or adult who is in need of the nutritional benefits of the formula. Moreover, the formulations disclosed herein are intended to cover both exempt and non-exempt formulations, where exempt formulations are "an infant formula intended for commercial or charitable distribution that is represented and labeled for use by infants who have inborn errors of metabolism or low birth weight, or who otherwise have unusual medical or dietary problems (21 CFR 107.3)."

According to certain embodiments, the olive oil comprises at least 5 wt % of the formula, such as at least 6 wt %, at least 7 wt %, at least 8 wt %, at least 9 wt %, and even at least 10 wt % of the formula. In yet other embodiments, the olive oil comprises no more than 35 wt % of the formula, such as no more than 30 wt %, no more than 25 wt %, no more than 20 wt %, no more than 15 wt %, no more than 10 wt %, and even no more than 8 wt % of the formula.

As a source of healthy monounsaturated fats, in one embodiment, the olive oil provided to the formula comprises the omega-9 fatty acid oleic acid in an amount of at least about 55 wt %, at least about 60 wt %, at least about 65 wt %, at least about 70 wt %, and/or at least about 75 wt % of the olive oil. According to certain embodiments, the olive oil comprises oleic acid in an amount of about 55 wt % to about 80 wt % of the olive oil. The olive oil can also provide other beneficial monounsaturated fats, vitamins such as vitamin E and K, and antioxidants, and may also have anti-inflammatory properties, in addition to other beneficial ingredients and properties.

According to certain embodiments, the nutritional formula comprises an oil blend, which includes both olive oil and one or more additional oils. In certain embodiments, the olive oil is a primary or even the main ingredient of the oil blend. For example, according to certain embodiments, the olive oil can comprise at least 20 wt % of the oil blend, such at least 25 wt %, at least 30 wt %, and even at least 35 wt % of the oil blend. According to further embodiments, the olive oil can comprise at least 20 wt % of the oil blend, such as at least 25 wt %, at least 30 wt %, and even at least 35 wt % of the oil blend. In certain embodiments, the oil blend comprises from about 10 wt % to about 50 wt % of the nutritional formula, such as from about 20 wt % to about 40 wt %, and even from about 25 wt % to about 35 wt % of the nutritional formula, such as about 29 wt % of the nutritional formula.

According to certain embodiments, the nutritional formula comprises an oil blend that further comprises linoleic sunflower oil. Sunflower oil is another healthy and natural source of unsaturated fats, including the omega-6 polyunsaturated fatty acid linoleic acid, as well as oleic acid and vitamin E. Linoleic sunflower oil can be extracted from sunflower seeds of sunflower plant varieties that naturally produce relatively higher amounts of linoleic acid than other varieties. For example, according to one embodiment, the linoleic sunflower oil used in the oil blend comprises linoleic acid in an amount of at least about 48 wt %, at least about 50 wt %, at least about 55 wt %, at least about 60 wt %, at least about 65 wt %, at least about 68 wt %, and/or at least about 70 wt % of the linoleic sunflower oil. According to certain embodiments, the linoleic sunflower oil comprises linoleic acid in an amount of about 48 wt % to about 74 wt % of the linoleic sunflower oil. In one embodiment, the oil blend comprises at least 15 wt % of linoleic sunflower oil, such as at least 20 wt %, and even at least 25 wt % of linoleic sunflower oil. In certain embodiments, the oil blend comprises no more than 35 wt % of linoleic sunflower oil, such as no more than 30 wt %, and even no more than 25 wt % of linoleic sunflower oil. In certain embodiments, the linoleic sunflower oil comprises at least 5 wt % of the nutritional formula, such as at least 6 wt %, at least 7 wt %, and even at least 8 wt % of the formula. In certain further embodiments, the linoleic sunflower oil comprises no more than 20 wt % of the nutritional formula, such as no more than 15 wt %, no more than 10 wt %, and even no more than 8 wt % of the formula.

According to certain embodiments, the nutritional formula comprises an oil blend that further comprises linoleic safflower oil. Like sunflower soil, safflower oil is also a healthy and natural source of unsaturated fats, including the omega-6 polyunsaturated fatty acid linoleic acid, as well as oleic acid and vitamin E. Linoleic safflower oil can be extracted from safflower seeds of safflower plant varieties that naturally produce relatively higher amounts of linoleic acid than other varieties. For example, according to one embodiment, the linoleic safflower oil used in the oil blend comprises linoleic acid in an amount of at least about 48 wt %, at least about 50 wt %, at least about 55 wt %, at least about 60 wt %, at least about 65 wt %, at least about 68 wt %, and/or at least about 70 wt % of the linoleic safflower oil. According to certain embodiments, the linoleic safflower oil comprises linoleic acid in an amount of about 48 wt % to about 74 wt % of the linoleic safflower oil. In one embodiment, the oil blend comprises at least 15 wt % of linoleic safflower oil, such as at least 20 wt %, and even at least 25 wt % of linoleic safflower oil. In certain embodiments, the oil blend comprises no more than 35 wt % of linoleic safflower oil, such as no more than 30 wt %, and even no more than 25 wt % of linoleic safflower oil. In certain embodiments, the linoleic safflower oil comprises at least 5 wt % of the nutritional formula, such as at least 6 wt %, at least 7 wt %, and even at least 8 wt % of the formula. In certain further embodiments, the linoleic safflower oil comprises no more than 20 wt % of the nutritional formula, such as no more than 15 wt %, no more than 10 wt %, and even no more than 8 wt % of the formula.

According to certain embodiments, the nutritional formula comprises an oil blend that further comprises canola oil. Canola oil is a vegetable-derived oil that contains relatively high amounts of healthy monounsaturated fatty acids and polyunsaturated fatty acids, including the omega-3 essential fatty acid linolenic acid ($\alpha$-linolenic acid). Canola oil is also a source of other essential fatty acids such as oleic acid, linoleic acid, and other beneficial ingredients such as plant sterols and tocopherols. The consumption of canola oil has also been shown to have an association with reduced coronary heart disease (Lin et al., Nutr. Rev. Jun; 71 (6): 370-385 (2013). For example, according to one embodiment, the canola oil used in the oil blend comprises linolenic acid in an amount of at least 5 wt % of the canola oil, such as at least 10 wt %, and even at least about 15 wt % of the canola oil. According to some embodiments, the oil blend comprises at least 20 wt % canola oil, such as at least 23 wt %, and even at least 25 wt % of canola oil. In certain embodiments, the oil blend comprises no more than 35 wt % canola oil, such as no more than 30 wt %, and even no more than 25 wt % of canola oil. According to some embodiments, the canola oil comprises at least 4 wt % of the nutritional formula, such as at least 5 wt %, at least 6 wt %, and even at least 7 wt % of the formula. In certain embodiments, the canola oil comprises no more than 15 wt % of the nutritional formula, such as no more than 10 wt %, no more than 8 wt %, and even no more than 7 wt % of the formula.

According to certain embodiments, the nutritional formula comprises an oil blend that further comprises coconut oil. Coconut oil is a natural and plant-based oil that is a source of saturated fats that promote growth in infants and serve as a source of energy. For example, according to one embodiment, the coconut oil used in the oil blend comprises saturated fats in an amount of at least 70 wt % of the coconut oil, such as at least 75 wt %, and even at least about 80 wt % of the coconut oil. In some embodiments, the oil blend comprises at least 5 wt % of coconut oil, such as at least 8 wt %, and even at least 10 wt % of coconut oil. In certain embodiments, the oil blend comprises no more than 25 wt % of coconut oil, such as no more than 20 wt %, and even no more than 15 wt % of coconut oil. In some embodiments, the coconut oil comprises at least 1 wt % of the nutritional formula, such as at least 2.5 wt %, at least 3 wt % and/or at least 4 wt % of the nutritional formula. In certain embodiments, the coconut oil comprises no more than 6 wt % of the nutritional formula, such as no more than 4.5 wt %, no more than 4 wt %, and even no more than 3.5 wt % of the formula.

According to certain embodiments, the nutritional formula comprises an oil blend that further comprises lecithin-Lecithin is a complex mixture of various phospholipids and fatty acids (along with trace fractions of carbohydrates, sterols, or moisture) and is considered an emulsifier. Technically, the fraction of phospholipids in the lecithin provides the emulsifier functionality, and the phospholipid content is at least about 50 wt % in the lecithin. In the present disclosure, any type of lecithin can be used in the formula. Non-limiting examples of lecithin as used in the present disclosure includes soy lecithin, sunflower lecithin, canola lecithin, or combinations thereof. For example, according to certain embodiments, the nutritional formula comprises an oil blend that further comprises canola lecithin. Canola lecithin comprises lecithin extracted from canola seeds, and is a mixture of materials including phospholipids and other emulsifiers. The lecithin acts as an emulsifier when combining oil-based ingredients with water-based substances, and as such, the lecithin can facilitate mixing of the oil blend when water is added to the formula to prepare for administration to an infant or toddler. For example, according to one embodiment, the lecithin comprises emulsifiers in an amount of at least 50 wt % of the lecithin, such as at least 55 wt %, and even at least about 60 wt % of the lecithin. According to some embodiments, the oil blend comprises at least 1 wt % of lecithin, such as at least 2 wt %, and even at least 3 wt % of lecithin. In certain embodiments, the oil blend comprises no more than 8 wt % of lecithin, such as no more than 5 wt %, and even no more than 4 wt % of lecithin. According to some embodiments, the lecithin comprises at least 0.3 wt % of the nutritional formula, such as at least 0.4 wt %, at least 0.6 wt %, and even at least 0.8 wt % of the formula. In certain embodiments, the lecithin comprises no more than 16 wt % of the nutritional formula, such as no more than 14 wt %, no more than 12 wt %, and even no more than 10 wt % of the formula.

According to certain embodiments, the nutritional formula comprises an oil blend that further comprises high oleic sunflower oil. As described in reference to the linoleic sunflower oil discussed above, sunflower oil is a healthy and natural source of unsaturated fats, including the omega-9 polyunsaturated fatty acid oleic acid, as well as linoleic acid and vitamin E. High oleic sunflower oil can be extracted from sunflower seeds of sunflower plant varieties that naturally produce relatively higher amounts of oleic acid than other varieties. For example, according to some embodiments, the high oleic sunflower oil comprises oleic acid in an amount of at least about 70 wt %, at least about 75 wt %, at least about 80 wt %, at least about 85 wt %, and/or at least about 90 wt % of the high oleic sunflower oil. According to some embodiments, the oil blend comprises at least 3 wt % of high oleic sunflower oil, such as at least 5 wt %, and even at least 8 wt % of high oleic sunflower oil. In certain embodiments, the oil blend comprises no more than 15 wt % high oleic sunflower oil, such as no more than 13 wt %, and even no more than 10 wt % of high oleic sunflower oil. In some embodiments, the high oleic sunflower oil comprises at least 1 wt % of the nutritional formula, such as at least 1.5 wt %, at least 2 wt %, and even at least 2.5 wt % of the formula. In certain embodiments, the high oleic sunflower oil comprises no more than 5 wt % of the nutritional formula, such as no more than 4 wt %, no more than 3.5 wt %, and even no more than 3 wt % of the formula.

According to certain embodiments, the nutritional formula comprises an oil blend that further comprises high oleic safflower oil. As described in reference to the linoleic safflower oil discussed above, safflower oil is a healthy and natural source of unsaturated fats, including the omega-9 polyunsaturated fatty acid oleic acid, as well as linoleic acid and vitamin E. High oleic safflower oil can be extracted from safflower seeds of safflower plant varieties that naturally produce relatively higher amounts of oleic acid than other varieties. For example, according to some embodiments, the high oleic safflower oil comprises oleic acid in an amount of at least about 70 wt %, at least about 75 wt %, at least about 80 wt %, at least about 85 wt %, and/or at least about 90 wt % of the high oleic safflower oil. According to some embodiments, the oil blend comprises at least 3 wt % of high oleic safflower oil, such as at least 5 wt %, and even at least 8 wt % of high oleic safflower oil. In certain embodiments, the oil blend comprises no more than 15 wt % high oleic safflower oil, such as no more than 13 wt %, and even no more than 10 wt % of high oleic safflower oil. In some embodiments, the high oleic safflower oil comprises at least 1 wt % of the nutritional formula, such as at least 1.5 wt %, at least 2 wt %, and even at least 2.5 wt % of the formula. In certain embodiments, the high oleic safflower oil comprises no more than 5 wt % of the nutritional formula, such as no more than 4 wt %, no more than 3.5 wt %, and even no more than 3 wt % of the formula.

As an example, according to certain embodiments, the oil blend comprises from about 25 wt % to about 40 wt % of olive oil, from about 25 wt % to about 35 wt % linoleic sunflower oil, from about 20 wt % to about 30 wt % of canola oil, from about 5 wt % to about 15 wt % coconut oil, and from about 1 wt % to about 5 wt % lecithin. In some embodiments, the formulation comprises from about 5 wt % to about 15 wt % of olive oil, from about 5 wt % to about 10 wt % of linoleic sunflower oil, from about 5 wt % to about 10 wt % of canola oil, from about 1 wt % to about 5 wt % of coconut oil, and from about 0.1 wt % to about 2 wt % of lecithin.

As another example, according to certain embodiments, the oil blend comprises from about 20 wt % to about 30 wt % of olive oil, from about 20 wt % to about 30 wt % linoleic sunflower oil, from about 20 wt % to about 30 wt % of canola oil, from about 10 wt % to about 20 wt % coconut oil, from about 1 wt % to about 5 wt % lecithin, and from about 5 wt % to about 15 wt % of high oleic sunflower oil. In some embodiments, the formulation comprises from about 5 wt % to about 12 wt % of olive oil, from about 5 wt % to about 10 wt % of linoleic sunflower oil, from about 5 wt % to about 10 wt % of canola oil, from about 1 wt % to about 5 wt % of coconut oil, from about 0.1 wt % to about 2 wt % of lecithin, and from about 1 wt % to about 5 wt % of high oleic sunflower oil.

According to certain embodiments herein, the nutritional formula comprises further ingredients that provide nutritional benefits or otherwise enhance the formula. For example, in some embodiments, the formula can further comprise at least one of soy lecithin, sunflower lecithin, calcium phosphate, potassium citrate, potassium phosphate, sodium chloride, sodium citrate, calcium carbonate, potassium hydroxide, potassium phosphate, magnesium chloride, potassium bicarbonate, potassium chloride, zinc sulfate, cupric sulfate, manganese sulfate, potassium iodide, sodium selenite, choline bitartrate, choline chloride, ascorbic acid, ascorbyl palmitate, inositol, mixed tocopherol concentrate, dl-alpha tocopheryl acetate (vitamin E), niacinamide (vitamin B3), calcium pantothenate, vitamin A palmitate, vitamin A acetate, riboflavin (vitamin B2), thiamine hydrochloride (vitamin B1), pyridoxine hydrochloride (vitamin B6), folic acid, phytonadione (vitamin K), biotin, cholecalciferol (vitamin D3), cyanocobalamin (vitamin B12), or combinations thereof.

According to further embodiments, an additional component included in the formula of the present disclosure is protein, a critical nutrient for growth, synthesis of enzymes and hormones. The proteins, as used herein, may include any proteins or nitrogen source suitable for human, especially infant, consumption. Such proteins are well known in the art and can be readily selected and prepared. Non-limiting examples of suitable protein sources include casein, whey, condensed skim milk, nonfat milk, soy, pea, rice, corn, hydrolyzed protein, free amino acids, or combinations thereof. For example, in some embodiments, the formula is a dairy-based formula. In some embodiments, the milk source is cow milk, which can be skimmed milk or whole milk. In other embodiments, the milk source can from goats, which can be skimmed goat milk or whole goat milk. In yet another embodiment, the protein source is a soy or vegetable-based protein source. According to yet another embodiment, the source of protein comprises at least partially or even fully hydrolyzed protein, such as hydrolyzed caseinates, hydrolyzed whey, or other hydrolyzed milk proteins, and/or hydrolyzed soy or other vegetable proteins, and may even comprise protein that has been hydrolyzed down to its constituent amino acids. Commercial protein sources are readily available and known to those skilled in the art.

According to some embodiments, the formula comprises docosahexaenoic acid (DHA). In some embodiments, the formula comprises *Schizochytrium* oil as a source of DHA. Other sources of DHA may include, for example, fish oil. According to further embodiments, the formula comprises an effective amount of arachidonic acid (ARA). In some embodiments, the formula comprises *Mortierella Alpina* oil as a source of ARA. Other sources of ARA may include, for example, fish oil. It has been established that the first year of life is a critical time of growth and development; several organs and systems including the brain, retina, and immune system rapidly mature during this time. Recent scientific evidence demonstrates that dietary variation of DHA and ARA during the first few months of life may have long-term effects on cognitive function. In addition, it has been determined that dietary DHA and ARA are essential for visual development and acuity in term infants. Hence, providing adequate amounts of these important long chain polyunsaturated fatty acids (LCPUFAs) throughout infancy can impact optimal growth and development (Tai et al. 2013; Bradbury, 2011; Tounian et al. 2021; Lien et al. 2017).

According to certain embodiments, the nutritional formula comprises, in addition to the oil blend, any or more of lactose, nonfat milk, whey protein concentrate, *Schizochytrium* Sp. oil, and *Mortierella Alpina* oil.

A person skilled in the art would appreciate that the formula of the present disclosure can be in any form suitable for any standard use in the food industry. For example, in one embodiment, the formula is in powdered form that has a long shelf life and is convenient for storage and transportation. In another embodiment, the formula is in liquid form that is packaged for instant use, such as a reconstituted liquid form. In certain embodiments, the oil blend provided as a part of the formula is added to dry components of the formula mixture and spray dried to provide a powdered form of the formula.

Another embodiment of the present disclosure is a method of providing nutrition to an infant. This method comprises administering a nutritional formula disclosed herein to the infant. In certain embodiments, the nutritional formula may also have nutritional benefits for toddlers, children, and even teens and adults, and accordingly aspects of the disclosure herein also contemplate administering to such persons.

Furthermore, as would be understood by those of ordinary skill in the art, effective dosage forms, modes of administration, and dosage amounts may be determined empirically, and making such determinations is within the skill of the art. It is understood by those skilled in the art that the dosage amount will vary with the route of administration, the rate of excretion, the duration of the treatment, the identity of any other agents being administered, the age, size, and species of the subject, and like factors well known in the arts of, e.g., nutritional formula or supplementation. In general, a suitable dose of an agent according to the disclosure will be that amount of the agent, which is the lowest dose effective to produce the desired effect with no or minimal side effects.

The following example is provided to further illustrate the formula of the present disclosure. This example is illustrative only and is not intended to limit the scope of the disclosure in any way.

EXAMPLE

The Formulas (1)-(3) below illustrate examples of olive oil-containing infant formulations, containing oil blends that impart nutritional benefits. For each formula below, the oil blend is combined into the formulation powder in an amount of 29 wt %, with the additional ingredients in the formulation comprising lactose (organic), nonfat milk (organic), whey protein (organic), and less than 2 wt % of *Schizochytrium* Sp. Oil, *Mortierella Alpina* oil, and other vitamins and minerals.

Formula (1)

| Oil Blend Ingredient | Approximate wt % of Oil Blend | Approximate wt % of Formulation Powder |
|---|---|---|
| Organic Olive Oil | 36% | 10.44% |
| Organic Linoleic Sunflower Oil | 26% | 7.54% |
| Organic Canola Oil | 24% | 6.96% |
| Organic Coconut Oil | 11% | 3.19% |
| Organic Canola Lecithin | 3% | 0.87% |

Formula (2) provides a reduced amount of olive oil, with relatively increased amounts of linoleic sunflower oil, canola oil, and coconut oil.

Formula (2)

| Oil Blend Ingredient | Approximate wt % of Oil Blend | Approximate wt % of Formulation Powder |
|---|---|---|
| Organic Olive Oil | 29% | 8.41% |
| Organic Linoleic Sunflower Oil | 28% | 8.12% |
| Organic Canola Oil | 27% | 7.83% |
| Organic Coconut Oil | 13% | 3.77% |
| Organic Canola Lecithin | 3% | 0.87% |

Formula (3) adds high oleic sunflower oil to supplement oleic acid levels, while levels of olive oil, linoleic sunflower oil, and canola oil are reduced, and levels of coconut oil are slightly increased.

Formula (3)

| Oil Blend Ingredient | Approximate wt % of Oil Blend | Approximate wt % of Formulation Powder |
|---|---|---|
| Organic Olive Oil | 26% | 7.54% |
| Organic Linoleic Sunflower Oil | 24% | 6.96% |
| Organic Canola Oil | 24% | 6.96% |
| Organic Coconut Oil | 14% | 4.06% |
| Organic High Oleic Sunflower Oil | 9% | 2.61% |
| Organic Canola Lecithin | 3% | 0.87% |

The following embodiments are provided to illustrate aspects of the disclosure, although the embodiments are not intended to be limiting and other aspects and/or embodiments may also be provided.

Embodiment 1. A nutritional formula for an infant comprising olive oil.

Embodiment 2. The formula according to Embodiment 1, wherein the olive oil comprises at least 5 wt %, at least 6 wt %, at least 7 wt %, at least 8 wt %, at least 9 wt %, and/or at least 10 wt % of the nutritional formula.

Embodiment 3. The formula according to any preceding Embodiment, wherein the olive oil comprises no more than 35 wt %, no more than 30 wt %, no more than 25 wt %, no more than 20 wt %, no more than 15 wt %, no more than 10 wt %, and/or no more than 8 wt % of the nutritional formula.

Embodiment 4. The formula according to any preceding Embodiment, wherein the olive oil comprises oleic acid in an amount of at least about 55 wt %, at least about 60 wt %, at least about 65 wt %, at least about 70 wt %, and/or at least about 75 wt % of the olive oil.

Embodiment 5. The formula according to any preceding Embodiment, wherein the olive oil comprises oleic acid in an amount of about 55 wt % to about 80 wt % of the olive oil.

Embodiment 6. The formula according to any preceding Embodiment, wherein the formula comprises an oil blend of the olive oil and one or more additional oils.

Embodiment 7. The formula according to Embodiment 6, wherein the oil blend comprises from about 10 wt % to about 50 wt %, from about 20 wt % to about 40 wt %, and/or from about 25 wt % to about 35 wt %, such as about 29 wt % of the formula.

Embodiment 8. The formula according to any of Embodiments 6-7, wherein the olive oil comprises at least 20 wt %, at least 25 wt %, at least 30 wt %, and/or at least 35 wt % of the oil blend.

Embodiment 9. The formula according to any of Embodiments 6-8, wherein the olive oil comprises no more than 45 wt %, no more than 40 wt %, no more than 35 wt %, and/or no more than 30 wt % of the oil blend.

Embodiment 10. The formula according to any of Embodiments 6-9, wherein the oil blend comprises linoleic sunflower oil.

Embodiment 11. The formula according to any of Embodiments 6-10, wherein the oil blend comprises at least 15 wt %, at least 20 wt %, and/or at least 25 wt % of linoleic sunflower oil.

Embodiment 12. The formula according to any of Embodiments 6-11, wherein the oil blend comprises no more than 35 wt %, no more than 30 wt %, and/or no more than 25 wt % of linoleic sunflower oil.

Embodiment 13. The formula according to any of Embodiments 6-12, wherein the linoleic sunflower oil comprises linoleic acid in an amount of at least about 48 wt %, at least about 50 wt %, at least about 55 wt %, at least about 60 wt %, at least about 65 wt %, at least about 68 wt %, and/or at least about 70 wt % of the linoleic sunflower oil.

Embodiment 14. The formula according to any of Embodiments 6-12, wherein the linoleic sunflower oil comprises linoleic acid in an amount of about 48 wt % to about 74 wt % of the linoleic sunflower oil.

Embodiment 15. The formula according to any of Embodiments 6-14, wherein the linoleic sunflower oil comprises at least 5 wt %, at least 6 wt %, at least 7 wt % and/or at least 8 wt % of the formula.

Embodiment 16. The formula according to any of Embodiments 6-15, wherein the linoleic sunflower oil comprises no more than 20 wt %, no more than 15 wt %, no more than 10 wt % and/or no more than 8 wt % of the formula.

Embodiment 17. The formula according to any of Embodiments 6-9, wherein the oil blend comprises linoleic safflower oil.

Embodiment 18. The formula according to any of Embodiments 6-9 and 17, wherein the oil blend comprises at least 15 wt %, at least 20 wt %, and/or at least 25 wt % of linoleic safflower oil.

Embodiment 19. The formula according to any of Embodiments 6-9 and 17-18, wherein the oil blend comprises no more than 35 wt %, no more than 30 wt %, and/or no more than 25 wt % of linoleic safflower oil.

Embodiment 20. The formula according to any of Embodiments 6-9 and 17-19, wherein the linoleic safflower oil comprises linoleic acid in an amount of at least about 48 wt %, at least about 50 wt %, at least about 55 wt %, at least about 60 wt %, at least about 65 wt %, at least about 68 wt %, and/or at least about 70 wt % of the linoleic safflower oil.

Embodiment 21. The formula according to any of Embodiments 6-9 and 17-20, wherein the linoleic safflower oil comprises linoleic acid in an amount of about 48 wt % to about 74 wt % of the linoleic safflower oil.

Embodiment 22. The formula according to any of Embodiments 6-9 and 17-21, wherein the linoleic safflower oil comprises at least 5 wt %, at least 6 wt %, at least 7 wt % and/or at least 8 wt % of the formula.

Embodiment 23. The formula according to any of Embodiments 6-9 and 17-22, wherein the linoleic safflower oil comprises no more than 20 wt %, no more than 15 wt %, no more than 10 wt % and/or no more than 8 wt % of the formula.

Embodiment 24. The formula according to any of Embodiments 6-23, wherein the oil blend comprises canola oil.

Embodiment 25. The formula according to any of Embodiments 6-24, wherein the oil blend comprises at least 20 wt %, at least 23 wt %, and/or at least 25 wt % of canola oil.

Embodiment 26. The formula according to any of Embodiments 6-25, wherein the oil blend comprises no more than 35 wt %, no more than 30 wt %, and/or no more than 25 wt % of canola oil.

Embodiment 27. The formula according to any of Embodiments 6-26, wherein the canola oil comprises linolenic acid in an amount of at least about 5 wt %, at least about 10 wt %, and/or at least about 15 wt % of the canola oil.

Embodiment 28. The formula according to any of Embodiments 6-27, wherein the canola oil comprises at least 4 wt %, at least 5 wt %, at least 6 wt % and/or at least 7 wt % of the formula.

Embodiment 29. The formula according to any of Embodiments 6-28, wherein the canola oil comprises no more than 15 wt %, no more than 10 wt %, no more than 8 wt % and/or no more than 7 wt % of the formula.

Embodiment 30. The formula according to any of Embodiments 6-29, wherein the oil blend comprises coconut oil.

Embodiment 31. The formula according to any of Embodiments 6-30, wherein the oil blend comprises at least 5 wt %, at least 8 wt %, and/or at least 10 wt % of coconut oil.

Embodiment 32. The formula according to any of Embodiments 6-31, wherein the oil blend comprises no more than 25 wt %, no more than 20 wt %, and/or no more than 15 wt % of coconut oil.

Embodiment 33. The formula according to any of Embodiments 6-32, wherein the coconut oil comprises saturated fats in an amount of at least about 70 wt %, at least about 75 wt %, and/or at least about 80 wt % of the coconut oil.

Embodiment 34. The formula according to any of Embodiments 6-33, wherein the coconut oil comprises at least 1 wt %, at least 2.5 wt %, at least 3 wt % and/or at least 4 wt % of the formula.

Embodiment 35. The formula according to any of Embodiments 6-34, wherein the coconut oil comprises no more than 6 wt %, no more than 4.5 wt %, no more than 4 wt % and/or no more than 3.5 wt % of the formula.

Embodiment 36. The formula according to any of Embodiments 6-35, wherein the oil blend comprises lecithin.

Embodiment 37. The formula according to Embodiment 36, wherein the lecithin is selected from the group consisting of soy lecithin, sunflower lecithin, canola lecithin, and combinations thereof.

Embodiment 38. The formula according to any of Embodiments 6-37, wherein the oil blend comprises at least 1 wt %, at least 2 wt %, and/or at least 3 wt % of lecithin.

Embodiment 39. The formula according to any of Embodiments 6-38, wherein the oil blend comprises no more than 8 wt %, no more than 5 wt %, and/or no more than 4 wt % of lecithin.

Embodiment 40. The formula according to any of Embodiments 6-39, wherein the lecithin comprises emulsifier in an amount of at least about 50 wt % of the lecithin.

Embodiment 41. The formula according to any of Embodiments 6-40, wherein the lecithin comprises at least 0.3 wt %, at least 0.4 wt %, at least 0.6 wt % and/or at least 0.8 wt % of the formula.

Embodiment 42. The formula according to any of Embodiments 6-41, wherein the lecithin comprises no more than 16 wt %, no more than 14 wt %, no more than 12 wt % and/or no more than 10 wt % of the formula.

Embodiment 43. The formula according to any of Embodiments 6-42, wherein the oil blend comprises high oleic sunflower oil.

Embodiment 44. The formula according to any of Embodiments 6-43, wherein the oil blend comprises at least 3 wt %, at least 5 wt %, and/or at least 8 wt % of high oleic sunflower oil.

Embodiment 45. The formula according to any of Embodiments 6-44, wherein the oil blend comprises no more than 15 wt %, no more than 13 wt %, and/or no more than 10 wt % of high oleic sunflower oil.

Embodiment 46. The formula according to any of Embodiments 6-45, wherein the high oleic sunflower oil comprises oleic acid in an amount of at least about 70 wt %, at least about 75 wt %, at least about 80 wt %, at least about 85 wt %, and/or at least about 90 wt % of the high oleic sunflower oil.

Embodiment 47. The formula according to any of Embodiments 6-46, wherein the high oleic sunflower oil comprises at least 1 wt %, at least 1.5 wt %, at least 2 wt % and/or at least 2.5 wt % of the formula.

Embodiment 48. The formula according to any of Embodiments 6-47, wherein the high oleic sunflower oil comprises no more than 5 wt %, no more than 4 wt %, no more than 3.5 wt % and/or no more than 3 wt % of the formula.

Embodiment 49. The formula according to any of Embodiments 6-42, wherein the oil blend comprises high oleic safflower oil.

Embodiment 50. The formula according to any of Embodiments 6-42 and 49, wherein the oil blend comprises at least 3 wt %, at least 5 wt %, and/or at least 8 wt % of high oleic safflower oil.

Embodiment 51. The formula according to any of Embodiments 6-42 and 49-50, wherein the oil blend comprises no more than 15 wt %, no more than 13 wt %, and/or no more than 10 wt % of high oleic safflower oil.

Embodiment 52. The formula according to any of Embodiments 6-42 and 49-51, wherein the high oleic safflower oil comprises oleic acid in an amount of at least about 70 wt %, at least about 75 wt %, at least about 80 wt %, at least about 85 wt %, and/or at least about 90 wt % of the high oleic safflower oil.

Embodiment 53. The formula according to any of Embodiments 6-42 and 49-52, wherein the high oleic safflower oil comprises at least 1 wt %, at least 1.5 wt %, at least 2 wt % and/or at least 2.5 wt % of the formula.

Embodiment 54. The formula according to any of Embodiments 6-42 and 49-53, wherein the high oleic safflower oil comprises no more than 5 wt %, no more than 4 wt %, no more than 3.5 wt % and/or no more than 3 wt % of the formula.

Embodiment 55. The formula according to any preceding Embodiment, wherein the oil blend comprises from about 25 wt % to about 40 wt % of olive oil, from about 25 wt % to about 35 wt % linoleic sunflower oil, from about 20 wt % to about 30 wt % of canola oil, from about 5 wt % to about 15 wt % coconut oil, and from about 1 wt % to about 5 wt % lecithin, and wherein the formulation comprises from about 5 wt % to about 15 wt % of olive oil, from about 5 wt % to about 10 wt % of linoleic sunflower oil, from about 5 wt % to about 10 wt % of canola oil, from about 1 wt % to about 5 wt % of coconut oil, and from about 0.1 wt % to about 2 wt % of lecithin.

Embodiment 56. The formula according to any preceding Embodiment, wherein the oil blend comprises from about 20 wt % to about 30 wt % of olive oil, from about 20 wt % to about 30 wt % linoleic sunflower oil, from about 20 wt % to about 30 wt % of canola oil, from about 10 wt % to about 20 wt % coconut oil, from about 1 wt % to about 5 wt % lecithin, and from about 5 wt % to about 15 wt % of high oleic sunflower oil, and wherein the formulation comprises from about 5 wt % to about 12 wt % of olive oil, from about 5 wt % to about 10 wt % of linoleic sunflower oil, from about 5 wt % to about 10 wt % of canola oil, from about 1 wt % to about 5 wt % of coconut oil, from about 0.1 wt % to about 2 wt % of lecithin, and from about 1 wt % to about 5 wt % of high oleic sunflower oil Embodiment 57. The formula according to any preceding Embodiment, wherein the formula comprises any one or more of lactose, nonfat milk, whey protein concentrate, *Schizochytrium* Sp. oil, and *Mortierella Alpina* oil.

Embodiment 58. The formula according to any preceding Embodiment, further comprising any one or more of soy lecithin, calcium phosphate, potassium citrate, sodium chloride, calcium carbonate, potassium hydroxide, potassium phosphate, magnesium chloride, potassium bicarbonate, ferrous sulfate, potassium chloride, zinc sulfate, cupric sulfate, manganese sulfate, potassium iodide, sodium selenite, choline bitartrate, ascorbyl palmitate, inositol, mixed tocopherol concentrate, dl-alpha tocopheryl acetate (vitamin E), niacinamide (vitamin B3), copper sulfate, mixed tocopherol concentrate, calcium pantothenate, vitamin A palmitate, riboflavin (vitamin B2), thiamine hydrochloride (vitamin B1), pyridoxine hydrochloride (vitamin B6), folic acid, phytonadione (vitamin K), biotin, cholecalciferol (vitamin D3), or combinations thereof.

Embodiment 59. The formula according to any preceding Embodiment, wherein the formula can be in powdered form or in liquid form.

Embodiment 60. A method of providing nutrition to an infant, the method comprising administering the nutritional formula according to any preceding Embodiment to the infant.

All documents cited in this application are hereby incorporated by reference as if recited in full herein.

Although illustrative embodiments of the present disclosure have been described herein, it should be understood that the disclosure is not limited to those described, and that various other changes or modifications may be made by one skilled in the art without departing from the scope or spirit of the disclosure.

What is claimed is:

1. A nutritional formula for an infant comprising an oil blend that consists of olive oil, linoleic sunflower oil and/or linoleic safflower oil, canola oil, coconut oil, and optionally any one or more of *Schizochytrium* Sp. oil, *Mortierella Alpina* oil and lecithin, wherein the olive oil is present in an amount of about 5 wt % to about 35 wt % of the formula, and wherein the formula can be in powdered form or in liquid form, and wherein the oils in the oil blend are the sole oils in the nutritional formula.

2. The formula according to claim 1, wherein the olive oil comprises oleic acid in an amount of about 55 wt % to about 80 wt % of the olive oil.

3. The formula according to claim 1, wherein the oil blend comprises from about 10 wt % to about 50 wt % of the formula.

4. The formula according to claim 1, wherein the olive oil comprises about 25 wt % to about 40 wt % of the oil blend.

5. The formula according to claim 1, wherein the oil blend comprises about 15 wt % to about 35 wt % of the linoleic sunflower oil.

6. The formula according to claim 5, wherein the linoleic sunflower oil comprises linoleic acid in an amount of about 48 wt % to about 74 wt % of the linoleic sunflower oil.

7. The formula according to claim 5, wherein the linoleic sunflower oil comprises from about 5 wt % to about 20 wt % of the formula.

8. The formula according to claim 1, wherein the oil blend comprises about 20 wt % to about 35 wt % of the canola oil.

9. The formula according to claim 8, wherein the canola oil comprises linolenic acid in an amount of at least about 5 wt % of the canola oil.

10. The formula according to claim 8, wherein the canola oil comprises from about 4 wt % to about 15 wt % of the formula.

11. The formula according to claim 1, wherein the oil blend comprises about 5 wt % to about 25 wt % of the coconut oil.

12. The formula according to claim 11, wherein the coconut oil comprises saturated fats in an amount of at least about 70 wt % of the coconut oil.

13. The formula according to claim 11, wherein the coconut oil comprises from about 1 wt % to about 6 wt % of the formula.

14. The formula according to claim 1, wherein the oil blend comprises about 1 wt % to about 8 wt % of the lecithin.

15. The formula according to claim 14, wherein the lecithin is selected from the group consisting of soy lecithin, sunflower lecithin, canola lecithin, and combinations thereof.

16. The formula according to claim 14, wherein the lecithin comprises emulsifier in an amount of at least about 50 wt % of the lecithin.

17. The formula according to claim 14, wherein the lecithin comprises from about 0.3 wt % to about 16 wt % of the formula.

18. The formula according to claim 1, wherein the oil blend comprises from about 25 wt % to about 40 wt % of the olive oil, from about 25 wt % to about 35 wt % of the linoleic sunflower oil, from about 20 wt % to about 30 wt % of the canola oil, from about 5 wt % to about 15 wt % of the coconut oil, and from about 1 wt % to about 5 wt % of the lecithin, and wherein the formula comprises from about 5 wt % to about 15 wt % of the olive oil, from about 5 wt % to about 10 wt % of the linoleic sunflower oil, from about 5 wt % to about 10 wt % of the canola oil, from about 1 wt % to about 5 wt % of the coconut oil, and from about 0.1 wt % to about 2 wt % of the lecithin.

19. The formula according to claim 1, wherein the formula comprises any one or more of lactose, nonfat milk, whey protein concentrate, *Schizochytrium* Sp. oil, *Mortierella Alpina* oil, soy lecithin, calcium phosphate, potassium citrate, sodium chloride, calcium carbonate, potassium hydroxide, potassium phosphate, magnesium chloride, potassium bicarbonate, ferrous sulfate, potassium chloride, zinc sulfate, cupric sulfate, manganese sulfate, potassium iodide, sodium selenite, choline bitartrate, ascorbyl palmitate, inositol, mixed tocopherol concentrate, dl-alpha tocopheryl acetate (vitamin E), niacinamide (vitamin B3), copper sulfate, mixed tocopherol concentrate, calcium pantothenate, vitamin A palmitate, riboflavin (vitamin B2), thiamine hydrochloride (vitamin B1), pyridoxine hydrochloride (vitamin B6), folic acid, phytonadione (vitamin K), biotin, cholecalciferol (vitamin D3), or combinations thereof.

20. The formula according to claim 1, wherein the oil blend comprises about 15 wt % to about 35 wt % of the linoleic safflower oil.

21. The formula according to claim 20, wherein the linoleic safflower oil comprises linoleic acid in an amount of about 48 wt % to about 74 wt % of the linoleic safflower oil.

22. The formula according to claim 20, wherein the linoleic safflower oil comprises from about 5 wt % to about 20 wt % of the formula.

* * * * *